(12) United States Patent
Welch et al.

(10) Patent No.: US 6,305,429 B1
(45) Date of Patent: Oct. 23, 2001

(54) DOUBLE WALLED PIPE STRUCTURES

(75) Inventors: Stuart Welch; Russell Dearden, both of Northants; Russell Codling, Kingsthorpe; Paul Summerfield, Oakham, all of (GB)

(73) Assignee: Corus UK Limited (GB)

( * ) Notice: Subject to any disclaimer, the term of this patent is extended or adjusted under 35 U.S.C. 154(b) by 0 days.

(21) Appl. No.: 09/284,468

(22) PCT Filed: Sep. 24, 1997

(86) PCT No.: PCT/GB97/02602

§ 371 Date: Jul. 8, 1999

§ 102(e) Date: Jul. 8, 1999

(87) PCT Pub. No.: WO98/17940

PCT Pub. Date: Apr. 30, 1998

(30) Foreign Application Priority Data

Oct. 21, 1996 (GB) .................................. 9621909

(51) Int. Cl.⁷ ................................ F16L 9/14; F16L 11/00
(52) U.S. Cl. ............................................. 138/149; 138/112
(58) Field of Search .................................... 138/112, 113, 138/148, 149, 89, 90

(56) References Cited

U.S. PATENT DOCUMENTS

| | | | |
|---|---|---|---|
| 1,111,688 | * 9/1914 | Bonitz | 138/148 |
| 2,706,495 | * 4/1955 | Risley | 138/148 |
| 4,124,040 | 11/1978 | Miller | 138/148 |

FOREIGN PATENT DOCUMENTS

| | | |
|---|---|---|
| 31 02 710 | 8/1982 | (DE) . |
| 0 586 944 | 3/1994 | (EP) . |
| 96/36831 | 11/1996 | (WO) . |

\* cited by examiner

*Primary Examiner*—David A. Scherbel
*Assistant Examiner*—Davis Hwu
(74) *Attorney, Agent, or Firm*—Blank Rome Comisky & McCauley, LLP

(57) ABSTRACT

Two embodiments of insulated pipework system are described. The first comprises an outer sleeve, an inner flow pipe and insulating material within the space therebetween and is characterised by the use of a longitudinally compressed elastomeric member in the space between the inner and outer pipes as the primary means for transferring longitudinal forces between the inner and outer pipes. The second comprises an outer sleeve pipe, an inner flow pipe, an insulating material within the space therebetween, other than hollow alumina-silicate microspheres, wherein a longitudinally compressed elastomeric member is provided at intervals in the space between the inner and outer pipes. Compression of the elastomeric member is preferably by way of rigid plates on either side thereof which compress an the elastomeric member. For example, bolts can be passed through bores in the plates and elastomeric member and tightened thereby to compress the said member. The elastomeric member is preferably in annular form and hence extends around the entire annular space between the two pipes.

4 Claims, 6 Drawing Sheets

Fig 1
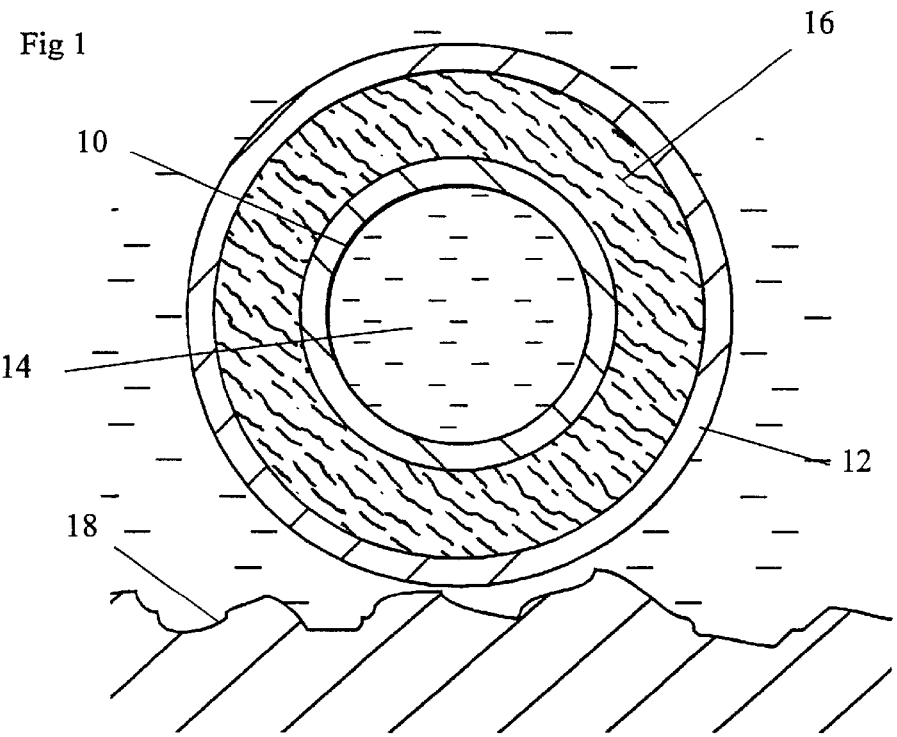
Fig 2
(a)
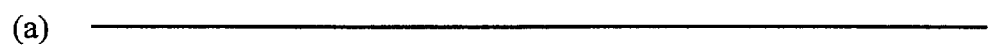
(b)
(c)
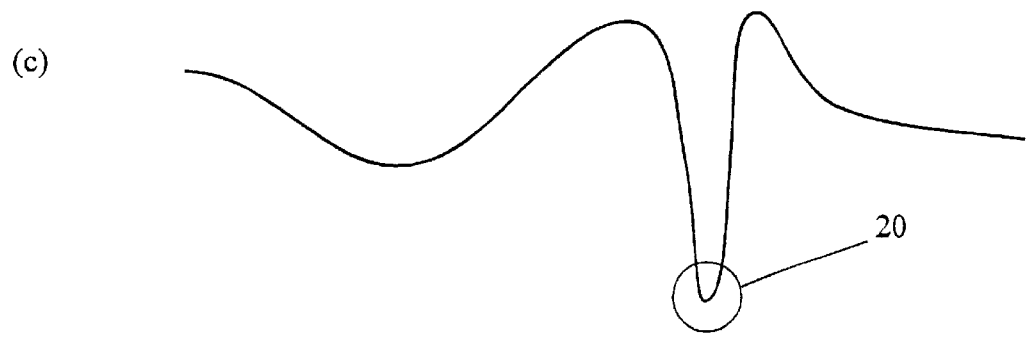

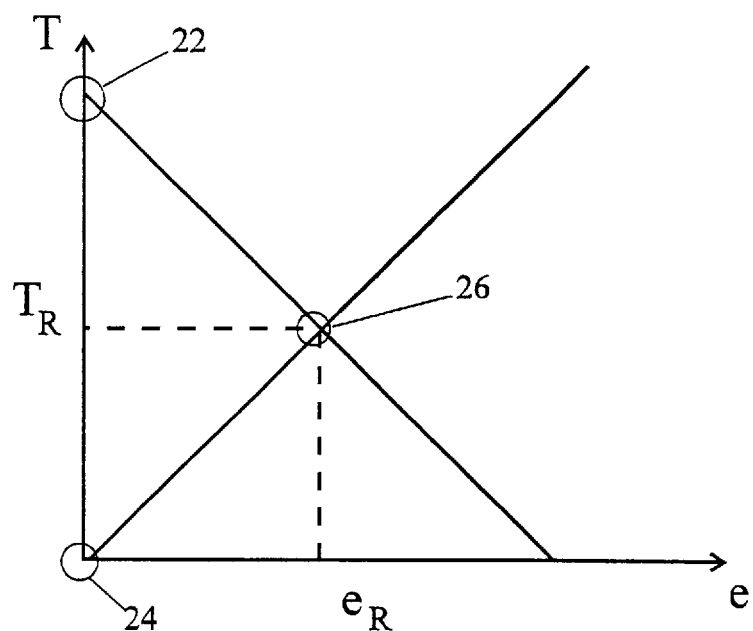
Fig 3a
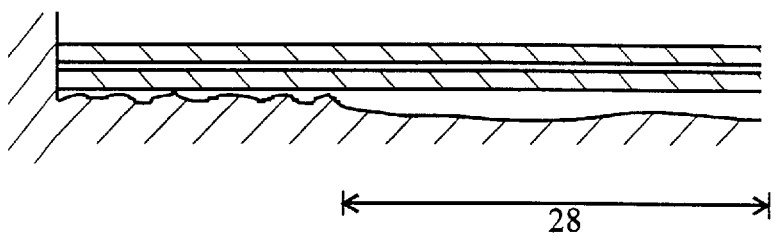
Fig 3b
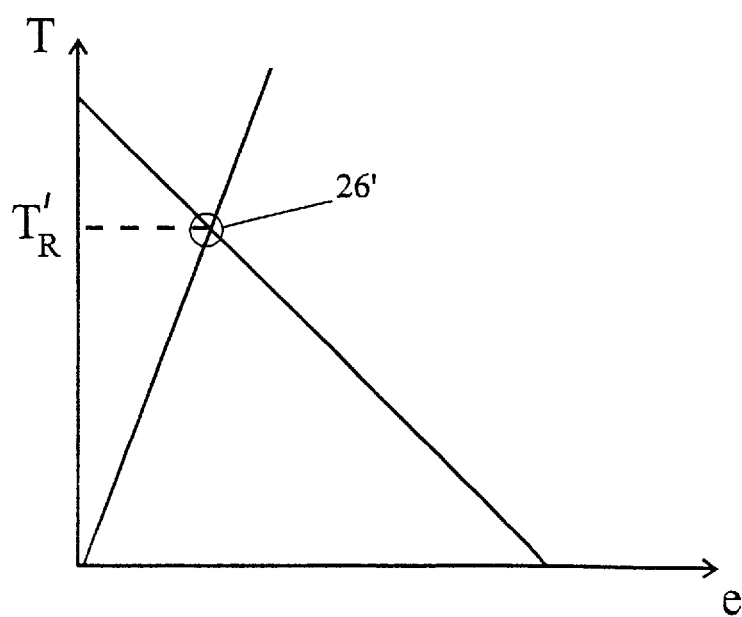

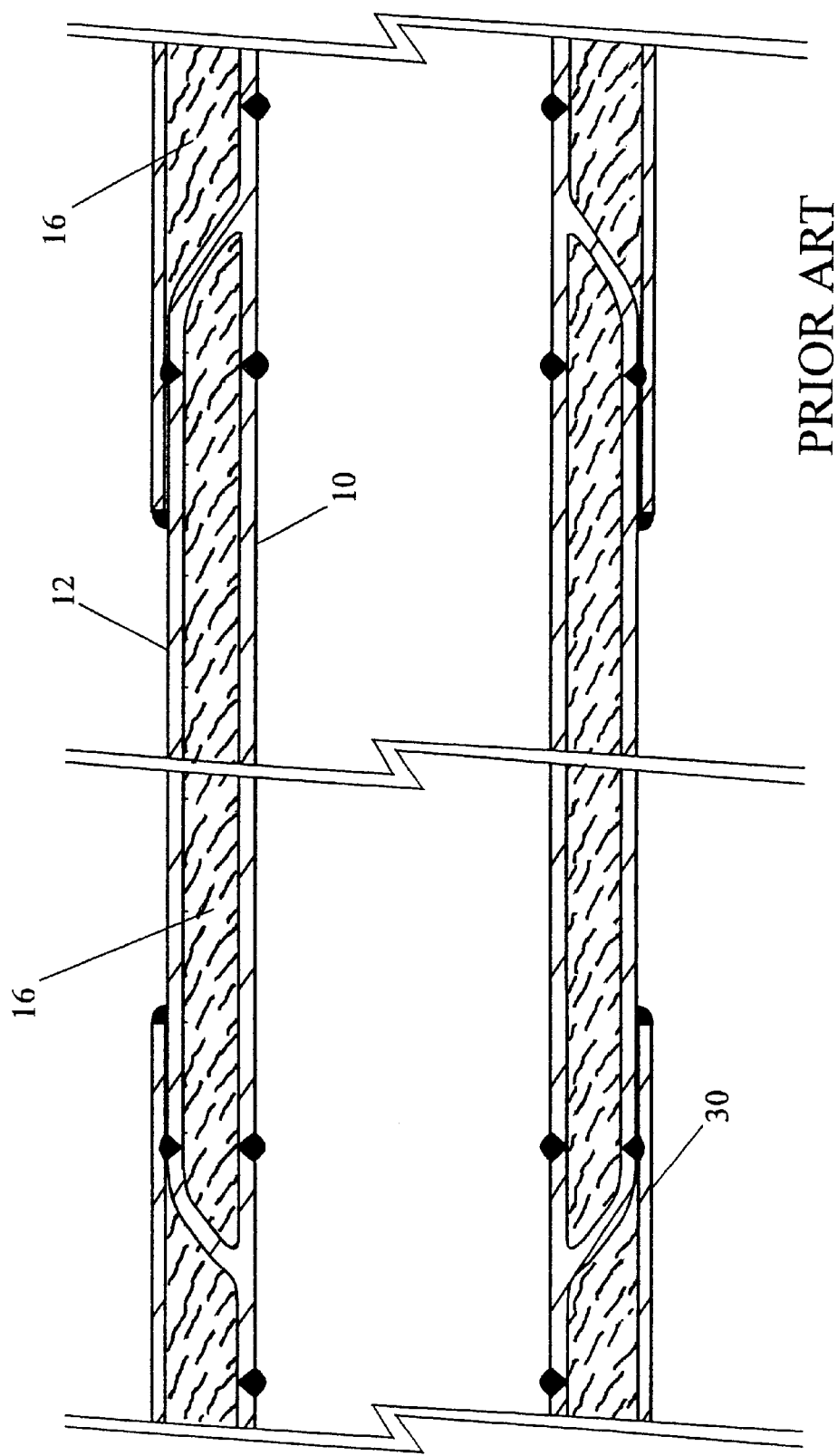

DOUBLE WALLED PIPE STRUCTURES

BACKGROUND OF THE INVENTION

1. Field of the Invention

The present invention relates to double walled pipe structures.

2. Description of Related Art

Such double walled pipe structures are often used for undersea pipelines in the oil extraction industry. Such pipelines lead from the undersea oilfield extraction point to a floating or subsea distribution point. The crude oil carried by these pipes normally emanates from beneath the surface at an elevated temperature. typically 110 to 190° C. If the crude oil is allowed to cool, lower melting point fractions will solidify and prevent further flow along the pipe. Hence, it is important to maintain the elevated temperature of the crude oil, at least until an initial separation stage can be effected.

This is normally achieved by insulating the pipeline. and FIG. 1 shows a known double walled pipe structure comprising an inner flow pipe 10 held concentrically within an outer sleeve pipe 12. Crude oil 14 flows within the flow pipe 10. An insulating material 16 is placed in the annular region between the flow pipe 10 and the sleeve pipe 12. The entire assembly is shown resting on the seabed 18.

The sleeve pipe 12 provides additional mechanical strength, and also prevents water from contacting the insulation material 16. Such insulation materials are commonly porous and would hence lose their insulating ability if they become wet. IT is therefore important to provide an adequate seal against longitudinal Ingress of water along the pipeline, and our earlier international application no. PCT/GB96/01129 filed May 13th, 1996 discloses an annular bulkhead suitable for such purpose.

An inevitable result of maintaining the crude oil at elevated temperature is that at least the flow pipe 10 will be subjected to thermal expansion. This will result inter alia in either an extension of the longitudinal length of the pipeline, or an increase in the longitudinal stress in the pipeline. Such stresses as may result from an increase to 190° C. are capable of causing plastic deformation in a steel pipeline. There are two generally accepted means of absorbing these thermal expansion problems; the first is to bury the pipeline beneath the seabed hence fixing it in position and preventing deformation. The other is to allow the initially straight pipeline shown in FIG. 2a to adopt a meandering course as shown in FIG. 2b and hence take up the increase in length. It is important that the longitudinal extension is maintained within acceptable limits, else a kink such as shown at 20 in FIG. 2c can develop. Such kinks, or areas of excessively high curvature, can cause the pipeline structure to exceed its design limitations Double walled pipe structures are effective in limiting the overall longitudinal extension, as shown in FIG. 3a. In the absence of longitudinal extension, the flow pipe 10 will be at an elevated tension shown at point 22, whilst the sleeve pipe 12 at ambient temperature will be at zero tension, shown at point 24. If both pipes are allowed to extend longitudinally, the composite structure will adopt a position in which the compressive tension in the flow pipe 10 balances the tensile tension in the sleeve pipe 12, i.e. at point 26. This point is a compromise situation in which the tension $T_R$ in both pipes is lower than a confined unextended pipeline, and the resultant extension is less than in an unconstrained single walled pipeline.

In order for this behaviour to be predictable, it is important that the flow and sleeve pipes 10 and 12 remain in longitudinal register. i.e. that individual elements of the pipe do not become longitudinally separated. The reason for this is shown schematically in FIG. 3d, in which it has been assumed that part of the sleeve pipe 12 is constrained, for example by interaction with the seabed, and that the corresponding part of the flow pipe 10 has become free to move longitudinally relative to that part of the sleeve pipe 12 This means that extension of the sleeve pipe 12 takes place effectively along a shorter length identified as 28, whilst extension of the flow pipe takes place along the entire length. The result of this is that a smaller extension of the sleeve pipe 12 will cause the same increase in tension, and the balance point 26' is at a significantly greater tension in both pipelines. This tension is greater than the original design tension arrived at in FIG. 3a and must therefore be avoided.

The maintenance of both pipelines in longitudinal register is commonly referred to as "longitudinal compliance". It will be clear that longitudinal compliance is achieved by ensuring adequate transfer of longitudinal forces between the two pipes.

FIG. 4 shows a method by which this has previously been achieved. A double walled pipeline is supplied in 24 meter lengths, which is comprises two 12 meter lengths of concentric pipes 10, 12 which are joined at their ends by annular castings which serve to join both pipes and lead to the resultant outlet of diameter corresponding to the flow pipe 10. This can be connected end to end to a similar structure. At the joins, a cylindrical cover 30 is welded in place to give a smooth external profile. Insulation 16 is usually fitted beneath the cover 30. Thus, a direct steel to steel link is formed between the two pipes.

The difficulty inherent in such a structure is that the castings are an integral part of the flow line 10 which is carrying a fluid at an elevated temperature and pressure. The castings must therefore meet the required design standards for the inner pipe, which requires careful control of the cast conditions. This difficulty inevitably increases the cost.

In the system described in our application number PCT/GB96/01129, such castings were omitted and the bulkheads disclosed were used to seal in place hollow alumina-silicate microspheres as the insulating medium 16. Such microspheres can, when compacted, provide a significant shear force transfer between the two pipes 10, 12. Hence, such a compacted insulator was capable of ensuring longitudinal compliance. The system disclosed in PCT/GB96/01129 relied on this effect.

Other solid insulating materials are generally polymeric and unable to withstand the elevated temperatures involved without degrading within the lifetime of the pipe. Fibrous insulation materials such as mineral wool have substantially no shear strength whatsoever and cannot therefore contribute to longitudinal compliance.

SUMMARY OF THE INVENTION

The present invention results from the discovery by the inventors that a bulkhead such as described in PCT/GB96/01129, ie a bulkhead comprising longitudinally compressed elastomeric annular sealing members, is indeed capable of providing shear force transfer. It is therefore sufficient to provide such bulkheads at regular intervals as the primary means of shear force transfer and not rely on any force transfer in the insulating medium. This will, for example, permit the use of alternative insulation materials other than alumina-silicate microspheres.

The present invention therefore provides in its first aspect an insulated pipework system comprising an outer sleeve, an inner flow pipe and insulating material within the space therebetween, characterised by the use of a longitudinally compressed elastomeric member in the space between The inner and outer pipes as The primary means for transferring longitudinal forces between the inner and outer pipes.

In its second aspect, the present invention provides an insulated pipework system comprising an outer sleeve pipe, an inner flow pipe, an insulating material within the space therebetween, other than hollow alumina-silicate microspheres, wherein a longitudinally compressed elastomeric member is provided at intervals in the space between the inner and outer pipes.

Compression of The elastomeric member is preferably by way of rigid plates on either side thereof which compress an the elastomeric member. For example, bolts can be passed through bores in the plates and elastomeric member and tightened thereby to compress the said member.

The elastomeric member of the above systems is preferably in annular form and hence extends around the entire annular space between the two pipes. More preferably, the annular rigid rings (when provided) are divided into separate segments as set out in PCT/GB96/00129. Such segments are more preferably staggered so that the separations between segments do not coincide with each other on opposed sides of the resilient member.

An embodiment of the present invention will now be described by way of example, with reference to the accompanying Figures,

A BRIEF DESCRIPTION OF THE FIGURES OF DRAWINGS

FIG. 1 is a cross-section of a conventional double walled pipeline;

FIGS. 2a, 2b and 2c show absorption of thermal expansion by deviation of the pipe;

FIGS. 3a and 3b illustrate force balancing in double walled pipe structures;

FIG. 4 is a longitudinal cross-section through a known double walled pipe structure;

DETAILED DESCRIPTION OF THE PREFERRED EMBODIMENT

FIGS. 1 to 4 have been described already, and no further elaboration will be given here.

Figure 5:
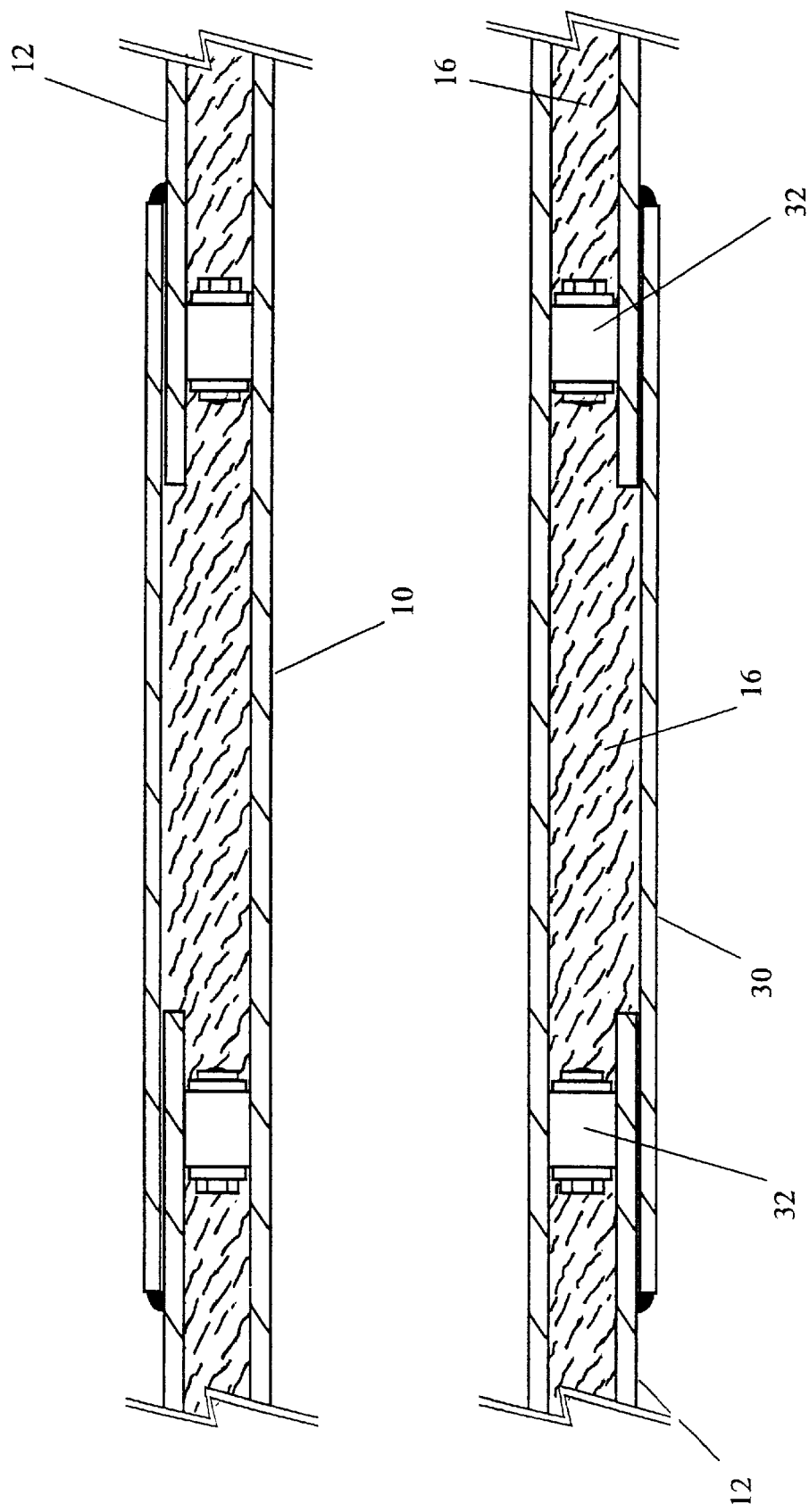
FIG. 5 shows a longitudinal cross-section through a pipe structure according the present invention.

FIG. 5 shows a longitudinal cross-section through a doubled walled pipe liner according to the present invention. A flow pipe 10 is contained concentrically within sleeve pipes 12. Insulation materials 16, which can be mineral wool or alumina-silicate microspheres compacted or uncompacted, is placed in the annular space between two pipes.

The flow pipe 10 is constructed from discrete lengths of pipe welded together to produce a substantially continuous length. The sleeve pipes 12 are constructed of slightly shorter lengths and hence an access gap is initially formed in the vicinity of each join. A bulkhead 32, to be described in more detail later, is fitted between the two pipes at each join and serves to retain the insulation material in place.

Once an individual length of double wall pipe has been formed, the flow pipe is then welded to the flow pipe of the previous length, and the region between the adjacent bulkheads 32 and extending across the join is filled out with insulating material 16. A cylindrical cover 30 is then welded into place over the previously exposed insulation 16 to give a continuous external profile.

Figure 6:
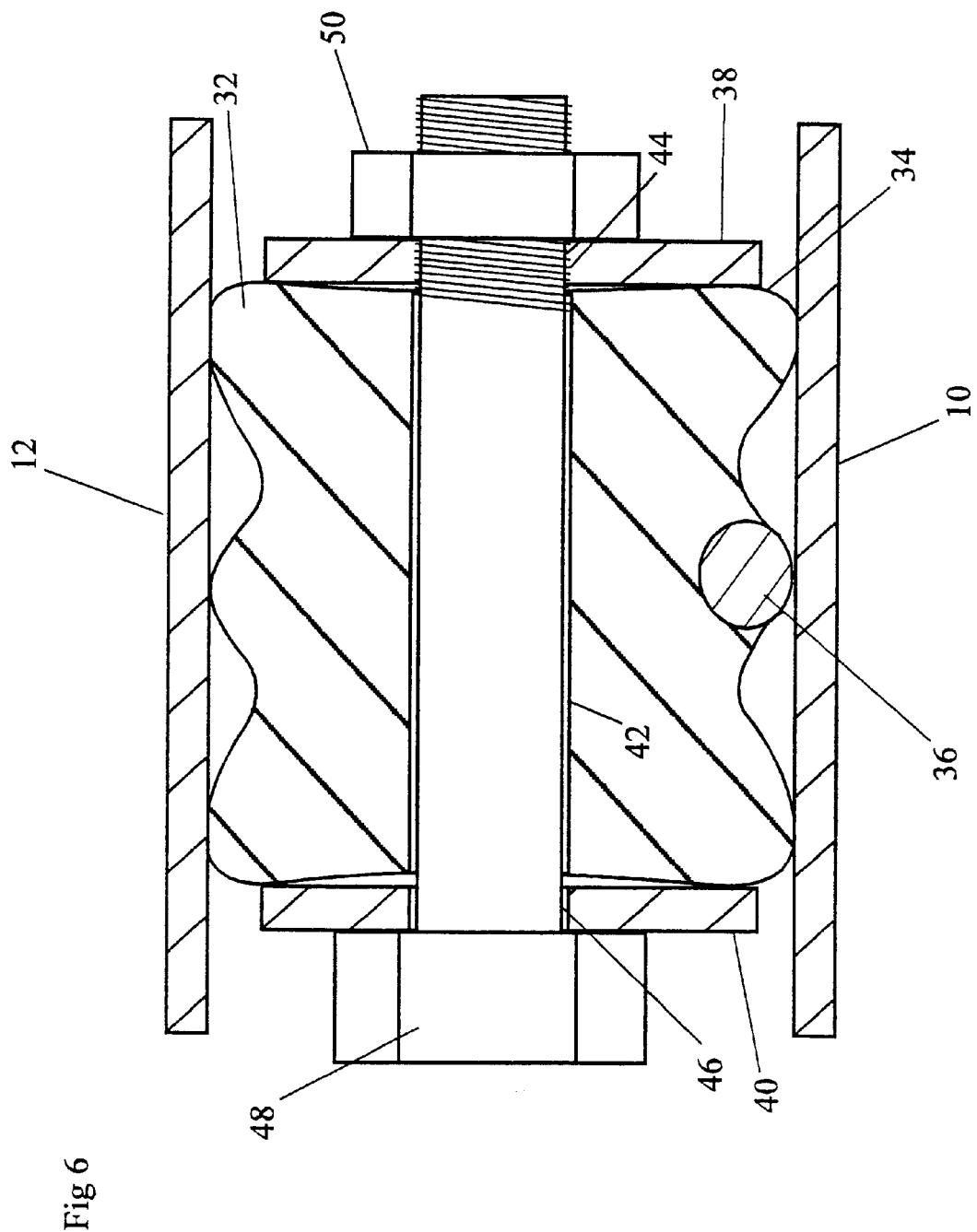
FIG. 6 shows the elastomeric sealing member of FIG. 5 in more detail.

FIG. 6 shows the bulkhead of FIG. 5 in cross-section, on a larger scale and in more detail. The cross-section shown is of the upper part an annular ring. An annular block 34 of EPDM rubber sits between the flow pipe 10 and sleeve pipe 12. The longitudinal faces are substantially flat, and the cylindrical inner and outer faces are formed with a plurality of ridges to ensure sealing contact when under compression. This provides the necessary sealing against water ingress into the insulation medium 60. Thus, if a leak should form (for example) in the cover 30, water will only contaminate the insulation 16 in the area between a pair of bulkheads 32 rather than along the entire pipeline. The central ridge on the inner cylindrical face, ie that contacting the flow pipe 10, is formed of a circular bead 36 of fluorastomer This sits recessed into the EPDM block 34 and projects outwardly to form the bridge. Fluorastomers are an alternative elastomer which is capable of withstanding higher temperatures such as those experienced by the flow pipe 10 containing the hot crude oil. Over the lifetime of the pipeline, the EPDM block 34 may degrade at its points of contact with the flow pipe 10, but the fluorastomer bead 36 will maintain an acceptable water seal.

Two compression plates 38, 40 contact the longitudinal annular faces of the EPDM block 34. A bore 42 is formed through the EPDM block, and this is aligned with corresponding holes 44, 46 in the compression plates 38, 40. A bolt 48 passes through the holes and bore 42, 44, 46 and is held in place with a nut 50. The nut and bolt 48, 50 are tightened to cause the compression plates 38, 40 to exert a longitudinal compressive force on the EPDM block 34.

The structure is repeated at angular intervals around the annulus, and hence the entire EPOM block 34 is placed in a longitudinal compression. This initially causes a radial expansion of the block, compressing it against the flow pipe 10 and sleeve pipe 12 and completing the water seal.

In addition, the inventors have now appreciated that the longitudinal friction between the pipes 10, 12 and the EPDM block 34 caused by the longitudinal compression of the block 34 is sufficient to provide adequate shear force transfer between the two pipes. This force can be as much as three tonnes, a fact which was not before appreciated.

Figure 7:
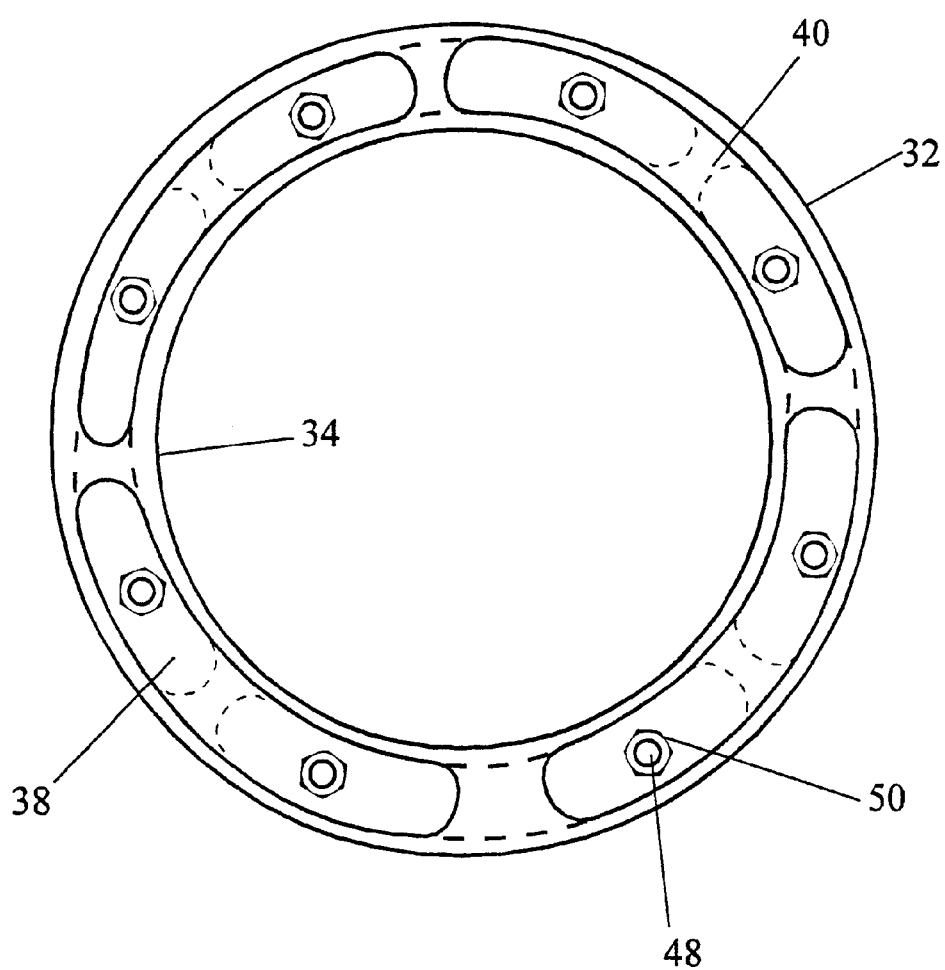
FIG. 7 is a lateral cross-section through the bulkhead of the present invention.

FIG. 7 shows a longitudinal view of the bulkhead 32. From this view, it can be seen that the compression plate 38 extends over a restricted angle of the annulus, in this case 90°, ie is not a complete circle. Each compression plate 38 supports two bolts 48, and the compression plates 40 on the opposing side of the EPDM block 34 are staggered.

It will be appreciated by those skilled in the art that the above described embodiment is by way of example only, and that many variations can be made to the above embodiment without departing from the scope of the present invention.

What is claimed is:

1. An insulated pipework system comprising an outer sleeve, an inner flow pipe, insulating material within the space therebetween, and a longitudinally compressed elastomeric member in the space between the inner and outer pipes as the primary means for transferring longitudinal forces between the inner and outer pipes; and wherein compression of the elastomeric member is by way of rigid plates on either side thereof which compress the elastomeric member, and the rigid plates are annular and divided into separate segments.

2. An insulated pipework system according to claim 1 wherein the segments are staggered so that the separations therebetween do not coincide with each other on opposed sides of the resilient member.

3. An insulated pipework system comprising an outer sleeve pipe, an inner flow pipe, insulating material within the space therebetween, other than hollow alumina-silicate microspheres, wherein a longitudinally compressed elastomeric member is provided at intervals in the space between the inner and outer pipes; and wherein compression of the elastomeric member is by way of rigid plates on either side thereof which compress the elastomeric member, and the rigid plates are annular and divided into separate segments.

4. An insulated pipework system according to claim 3 wherein the segments are staggered so that the separations therebetween do not coincide with each other on opposed sides of the resilient member.

* * * * *